United States Patent [19]

Masuda et al.

[11] 4,451,852
[45] May 29, 1984

[54] IMAGE DISPLAY APPARATUS

[75] Inventors: Mitsuya Masuda, Kyoto; Sadahiro Iyehara, Suita; Shizuo Inohara, Toyonaka; Minoru Ueda, Takatsuki; Keisuke Yamamoto, Ibaraki, all of Japan

[73] Assignee: Matsushita Electric Industrial Co., Ltd., Kadoma, Japan

[21] Appl. No.: 343,755

[22] Filed: Jan. 28, 1982

[30] Foreign Application Priority Data

Feb. 10, 1981 [JP] Japan .................................. 56-18782
Jun. 18, 1981 [JP] Japan .................................. 56-94993

[51] Int. Cl.³ ...................... H04N 9/12; H04N 5/66; H01J 31/10
[52] U.S. Cl. ...................................... 358/230; 358/56; 358/242; 313/422; 315/366
[58] Field of Search .............. 358/230, 231, 241, 242, 358/56, 59, 64, 65, 66, 67, 68; 340/704, 713, 713, 752, 772, 781, 783, 793, 794; 315/13 R, 383, 13 CG, 366; 313/409, 411, 413, 414, 422

[56] References Cited

U.S. PATENT DOCUMENTS

| | | | |
|---|---|---|---|
| 3,720,859 | 3/1973 | Hilden | 315/383 |
| 3,800,186 | 3/1974 | Yamane | 340/772 |
| 3,992,644 | 11/1976 | Chodil | 358/56 |
| 4,158,210 | 6/1979 | Watanabe | 358/56 |
| 4,170,771 | 10/1979 | Bly | 358/241 |
| 4,170,772 | 10/1979 | Bly | 358/59 |
| 4,227,117 | 10/1980 | Watanabe | 315/366 |

Primary Examiner—Tommy P. Chin
Attorney, Agent, or Firm—Cushman, Darby & Cushman

[57] ABSTRACT

A video image display apparatus of the flat tube and multi line cathode type of the present invention includes a phosphor screen, and a predetermined number (e.g. 15) of line cathodes for in-turn emitting a predetermined number of horizontal rows of electron beams. Each row has a second predetermined number (e.g. 320) of rod shaped electron beams for together producing one horizontal line of image on the phosphor screen. A vertical deflection means is provided for vertical deflection of the electron beams in turn at one vertically divided segment corresponding to one of the horizontal rows by means of a vertical deflection signal, e.g. a step wave having a saw-tooth wave envelope. The envelope is adjusted so as to be expanded or compressed or level changed, thereby eliminating any undesirable black horizontal band on the screen due to non-uniformity of electrode construction. A uniform raster is thereby obtainable.

11 Claims, 12 Drawing Figures

FIG.5 one vertical time period
(includes 16H time period)

IMAGE DISPLAY APPARATUS

BACKGROUND OF THE INVENTION

1. Field of the Invention

The present invention relates to an image display apparatus comprising a flat cathode-ray tube with a number of (for example fifteen) line cathodes.

More particularly, the present invention concerns an image display apparatus for displaying an image by means of a phosphor screen and a plural number of parallel disposed line cathodes.

2. Description of the Prior Art

Hitherto, for an image display apparatus for a television set, a cathode-ray tube having three electron guns or a single electron gun set in a neck part of a bulky cone shaped vacuum enclosure has been used for a long time. The shortcoming of the conventional cathode ray tube is a large depth in comparison with the size of the screen face, preventing providing a flat and compact television set. Though EL display apparatus, plasma display apparatus or liquid crystal display apparatus has been developed, these are not sufficiently usable for practical use because they have problems in brightness and contrast.

SUMMARY OF THE INVENTION

Therefore, the present invention is intended to provide a television set with a flat shaped display apparatus.

The present invention enables displaying image of a high quality without undesirable horizontal black bands or horizontal white bands or undesirable partial vertical expansion or partial vertical contraction due to nonuniform vertical scannings.

The image display apparatus in accordance with the present invention comprises:

a phosphor screen having a phosphor layer for emitting light at impingement by an electron beam, an electron beam source for in-turn emitting a predetermined number of horizontal rows of electron beams, for producing one horizontal line of image on the phosphor screen, a vertical deflection means for vertical deflections of the electron beams of the horizontal rows in a manner that electron beams of a horizontal row impinging the phosphor screen at one vertically divided segment corresponding to one of the horizontal row simultaneously driven vertically, thereby vertically moving one of the horizontal line in the vertically divided segment, an adjusting means for adjusting pitches of the horizontal lines by adjusting wave forms of a signal to be impressed on the vertical deflection means for respective vertically divided segments, and a flat shaped vacuum enclosure containing the above-mentioned components therein, one end face thereof forming a screen face in which the color phosphor screen is provided.

Operating circuit and details of deflection electrodes are arranged so as to obtain satisfactory displaying of uniform raster, and these arrangements are explained in detail referring to the accompanying drawing.

DESCRIPTION OF THE PREFERRED EMBODIMENTS

Figure 1:
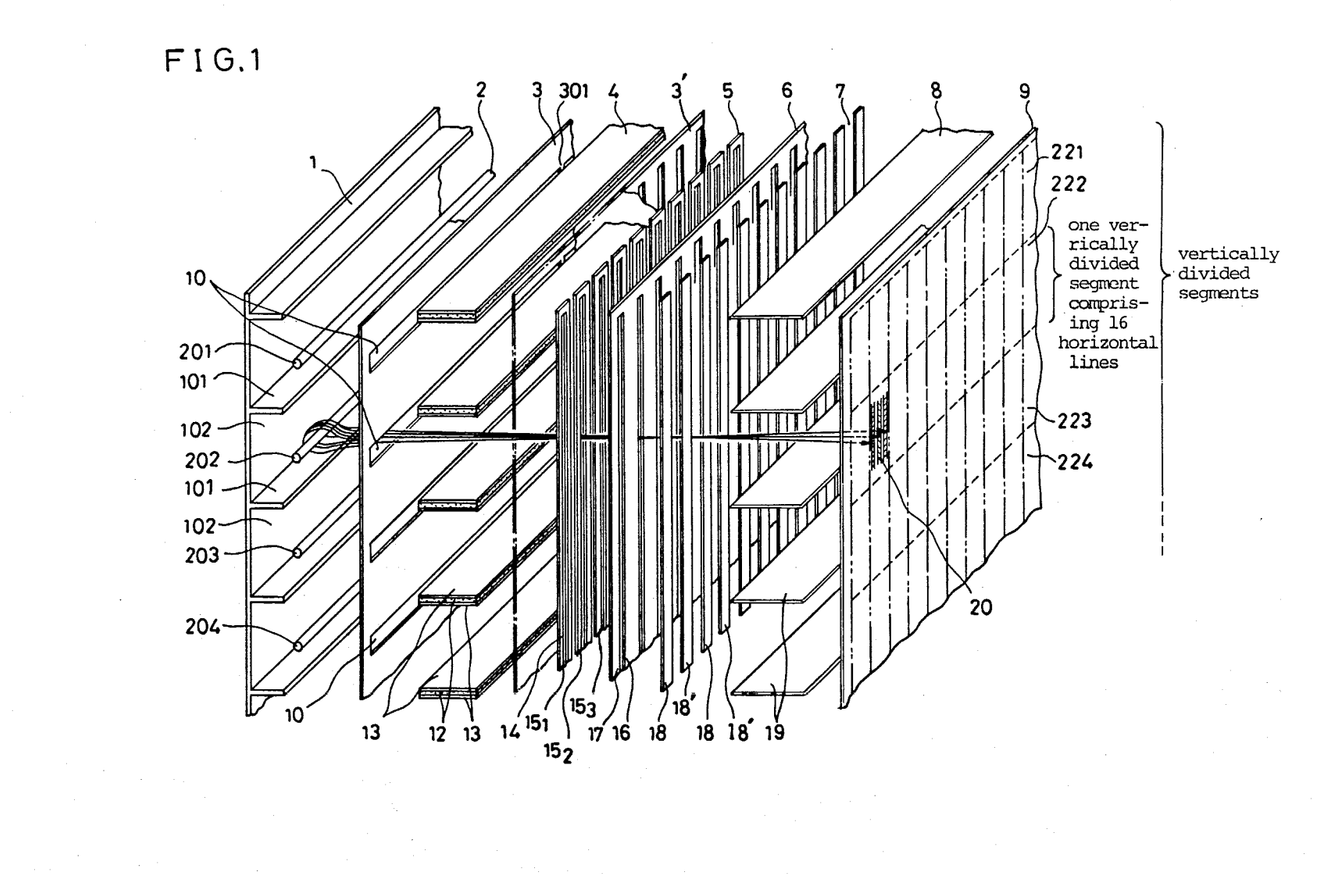
FIG. 1 is an exploded perspective view of a principal part, with its vacuum enclosure removed, of a cathode-ray discharge tube for use in embodying the present invention, expanded of its size in the horizontal direction enlarged in comparison with the vertical direction for easier drawing of minute constructions.

Configuration of one preferred example of the present invention is shown in FIG. 1, wherein from the back part to front part the following components are provided in a flat box shaped evacuated envelope not shown here, but preferably made of glass:

a back electrode 1 having horizontal isolation walls 101, 101 . . . projecting perpendicularly therefrom forming isolated spaces 102, 102 . . . therein, a row of a predetermined number (e.g. 15 in this embodiment) of horizontal line cathodes 201, 202, . . . disposed substantially horizontally in the isolated spaces 102, 102 . . . , a vertical beam-focussing electrode 3 having the predetermined number (e.g. 15 in this embodiment) of horizontal slits 10, a first vertical deflection means 4 comprising the predetermined number of pair of vertical deflection electrodes 13', 13 . . . , held by insulator board 12. Each pair of vertical deflection electrodes comprises an upper electrode 13 and a lower electrode 13' both disposed substantially horizontal and defining a deflection space inbetween disposed before the corresponding horizontal slit 10, a second vertical beam-focussing electrode 3' substantially similar to the horizontal beam-focussing electrode 6, a predetermined large number (e.g. 320 for this embodiment) of beam control electrodes 5 consisting of vertical strip electrodes $15_1, 15_2 \ldots 15_{320}$ each having beam-passing slits 14, 14 . . . disposed with uniform pitch, a horizontal beam-focussing electrode 6 having the predetermined number (e.g. 320 for this embodiment) of vertical slits at positions in front of the slits 14,14 . . . of the beam control electrodes 5, 5 . . . , a horizontal deflection means 7 comprising the predetermined number (e.g. 320 for this example) of vertical strip electrodes 18, 18′, 18, 18′ . . . defining the predetermined number (e.g. 320 for this example) of vertically oblong deflection gaps inbetween, a beam acceleration means 8 consisting of a set of horizontally disposed electrodes 19, 19 . . . , and finally a phosphor screen 9, which is ordinarily provided on the inner wall of a front face of the enclosure.

The line cathodes 201, 202 . . . form electron beam source 2, wherein horizontal line cathodes are disposed forming a vertical row, with substantially uniform gaps with each other. In this example, as above-mentioned 15 line cathodes 201, 202 . . . 215 are provided, but only four of them are shown. The line cathodes are made by coating a tungsten wire of, for example, 10–20 $\mu$m diameter with known electron emitting cathode oxide. All the line cathodes are heated by feeding current thereto, and selective in-turn taking out of horizontal sheet shaped electron beam from selected one of the line cathode is done by changing a potential of the in-turn selected line cathode to negative with respect to the potential of the focussing electrode 3.

The back electrode 1 serves to suppress emissions of electrons from other line cathodes than the selected one and also expel the electrons from the selected cathode to its front direction. The back electrode 1 may be formed by attaching conductive substance such as conductive paint on the inner wall of the back face of the flat type vacuum enclosure. A flat plane shaped cathode may be used in place of the row of the line electrode 201, 202 . . . .

The first vertical beam-focussing electrode 3 have the slits 10 at the position to face the line cathodes 201, 202 . . . and is impressed with a DC voltage, therefore horizontal sheet shaped electron beam from a selected line cathode is formed. The sheet shaped electron beam is then divided into a large number (e.g. 320 in this example) of narrow electron beams by passing through the second vertical beam focussing electrode 3′, the control electrode 5 and horizontal focussing electrode 6. In FIG. 1, only one such narrow electron beam is shown for simplicity. Each slit 10 may have supporting ribs in midway part of the length, or further may consist of a large number (e.g. 320) of openings with very narrow rib parts 301 inbetween.

The electrodes 13, 13′ of the vertical deflection means 4 are disposed at levels of substantially the centers between vertically neighboring two horizontal slits 10, 10 of the vertical focussing electrode 3, and a lower electrode 13 and an upper electrode 13′ are held on both faces (upper and lower faces) of an insulation board 12. A changing voltage (a vertical deflection signal) is impressed across the pair of upper electrode and lower electrode of each pair thereby forming changing electric field for vertical deflection. In this example, as has been elucidated, by impressing the 16-step changing voltage across the pair electrodes, each electron beam is deflected in a manner to have 16 levels. And the same matter takes place in each of 15 vertically divided segments 221, 222, 223 . . . 235 on the phosphor screen. Accordingly, the phosphor screen 9 has 240 horizontal lines in total (16 lines×15 segments=240 lines).

The beam control electrodes 5 comprising 320 strip electrodes $15_1, 15_2 \ldots 15_{320}$ together with the horizontal beam-focussing electrode 6 divide the horizontal sheet shaped electron beam into 320 rod shaped electron beams, and each strip electrodes $15_1, 15_2 \ldots 15_{320}$ of the beam control electrodes 5 control intensities of the rod shaped electron beams responding to the information of the video signal. Therefore, the 320 strip electrodes control information of 320 picture elements on each horizontal line. The 320 beam control electrodes receive 320 control signals respectively and control the 320 rod beams in such a manner as, at one time for red color irradiation, at one time for green color irradiation and at one time for blue color irradiation, in turn. In order to display a color picture on the color phosphor screen with the control signals applied to the beam control electrodes, each picture element comprises three elementary color regions, namely red strip region, green strip region and blue strip region, which are disposed in a horizontal direction.

The feature of the present embodiment is that all the 320 beam control electrodes $15_1, 15_2 \ldots 15_{320}$ receive the beam control signals for displaying respective three primary colors, i.e., red and blue or green, at a same time. That is, at one moment, one horizontal line on the phosphor screen displays an image of red color parts and blue color parts of the line by impingements of red phosphor regions by odd number electron beams and impingements of blue phosphor regions by even number electron beams, at the next moment an image of green color part of the line, and at the next moment an image of red color parts and blue color part of the line by impingements of red color phosphors regions by even number electron beams and impingements of blue color phosphor regions by odd number electron beams. In this apparatus, the odd number electronic switches $35_1$, $35_3, 35_5 \ldots 35_{15}$ switch to feed signal in the order of R, G and B, and the even number electronic switches $35_2$, $35_4 \ldots 35_{14}$ switch in the order of B, G and R.

The horizontal beam-focussing electrode 6 is impressed with a DC voltage and focusses the rod shaped electron beams in a horizontal direction.

The horizontal deflection means 7 comprises strip electrodes 18, 18′ . . . which are disposed at the positions in front of center positions between neighboring slits 16, 16 of the horizontal beam-focussing electrode 6. Each of the strip electrodes pair 18, 18′ is impressed with 3-level changing voltage or a horizontal deflection signal, and horizontally deflects rod shaped electron beams, thereby making the rod shaped electron beams selectively impinge red phosphor regions, green phosphor regions or blue phosphor regions in turn.

In the example, where a horizontal row of 320 rod shaped electron beams impinge 320 sets of three primary color regions, one horizontal deflection range corresponds to one horizontal picture element width.

The horizontally disposed electrodes of the beam-acceleration means 8 are disposed at the height level corresponding to those of the composite body of vertical deflection electrodes 13 and 13′ and are impressed with a DC voltage.

The phosphor screen 9 may be provided with a known metal back layer (not shown) formed on the side of cathodes and a positive DC voltage is impressed thereon. In practical example, the phosphor regions are formed as vertically oblong strips of red color phosphor, green color phosphor and blue color phosphor. In FIG. 1, horizontal broken lines on the phosphor screen 9 show boundary lines between neighboring vertically divided segments to be impinged by electron beams of respective line cathodes. Vertical chain lines on the phosphor screen 9 show boundary lines between horizontally neighboring sets of three primary color phosphor strips.

Figure 2:
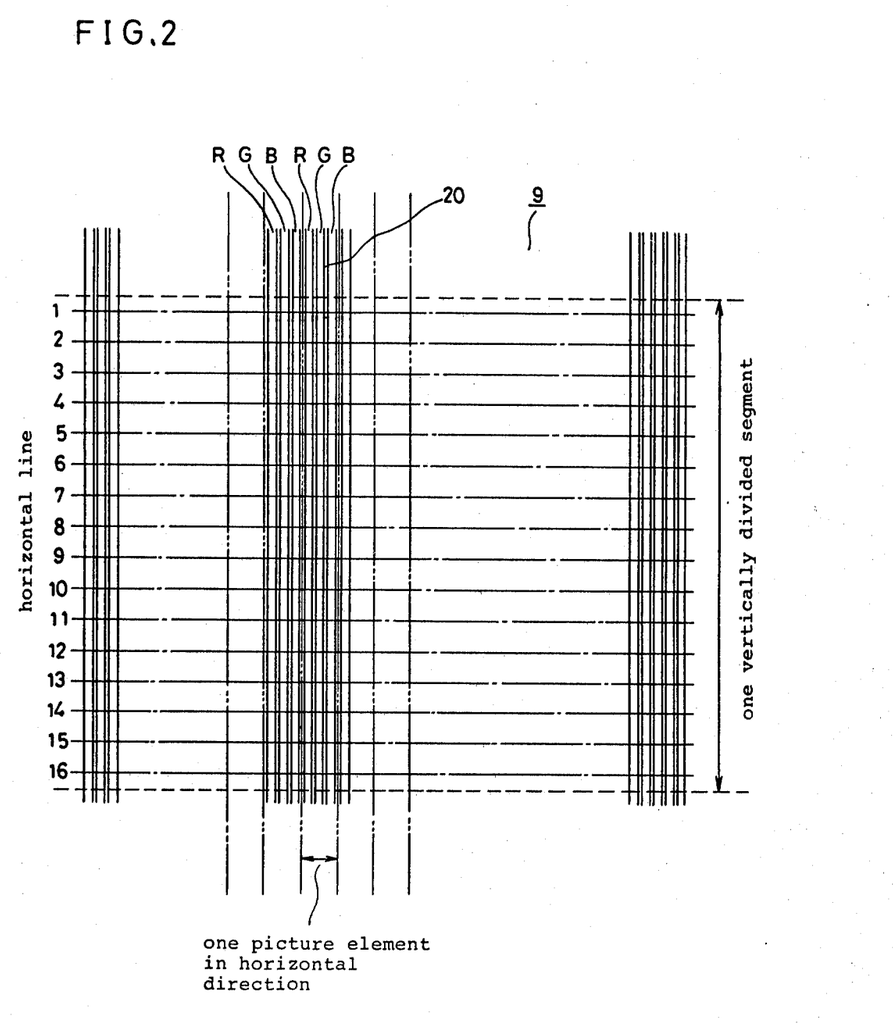
FIG. 2 is a schematic front view of a phosphor screen of the apparatus of FIG. 1.

A small segment 20, which is defined by two neighboring vertical chain lines and two neighboring horizontal broken lines, is shown enlarged in schematic view of FIG. 2, wherein the small segment 20 has 16 horizontal lines in vertical row. In an actual example, one segment has the size of 16 mm high in vertical direction and 1 mm width in horizontal direction, and in FIG. 1 the sizes are shown enlarged in widthwise direction as has been mentioned.

Apart from the above-mentioned example where 320 sets of three primary color phosphor regions are formed widthwise of the phosphor screen for 320 rod shaped electron beams produced by 320 slits 14 of the beam-control electrode 5 and 320 slits 16 of the horizontal beam-focussing electrode 6, such a modification may be made that for the 320 sets of three primary color phosphor regions, 160 rod-shaped electron beams are provided, and in this case the horizontal deflection signal is a 6-level changing voltage which deflects the rod-shaped electron beam to sweep for the horizontal range of the color phosphor regions of RGBRGB, and each of the beam-control electrodes 5 also receives the control signal for two picture elements in sequence.

Figure 3:
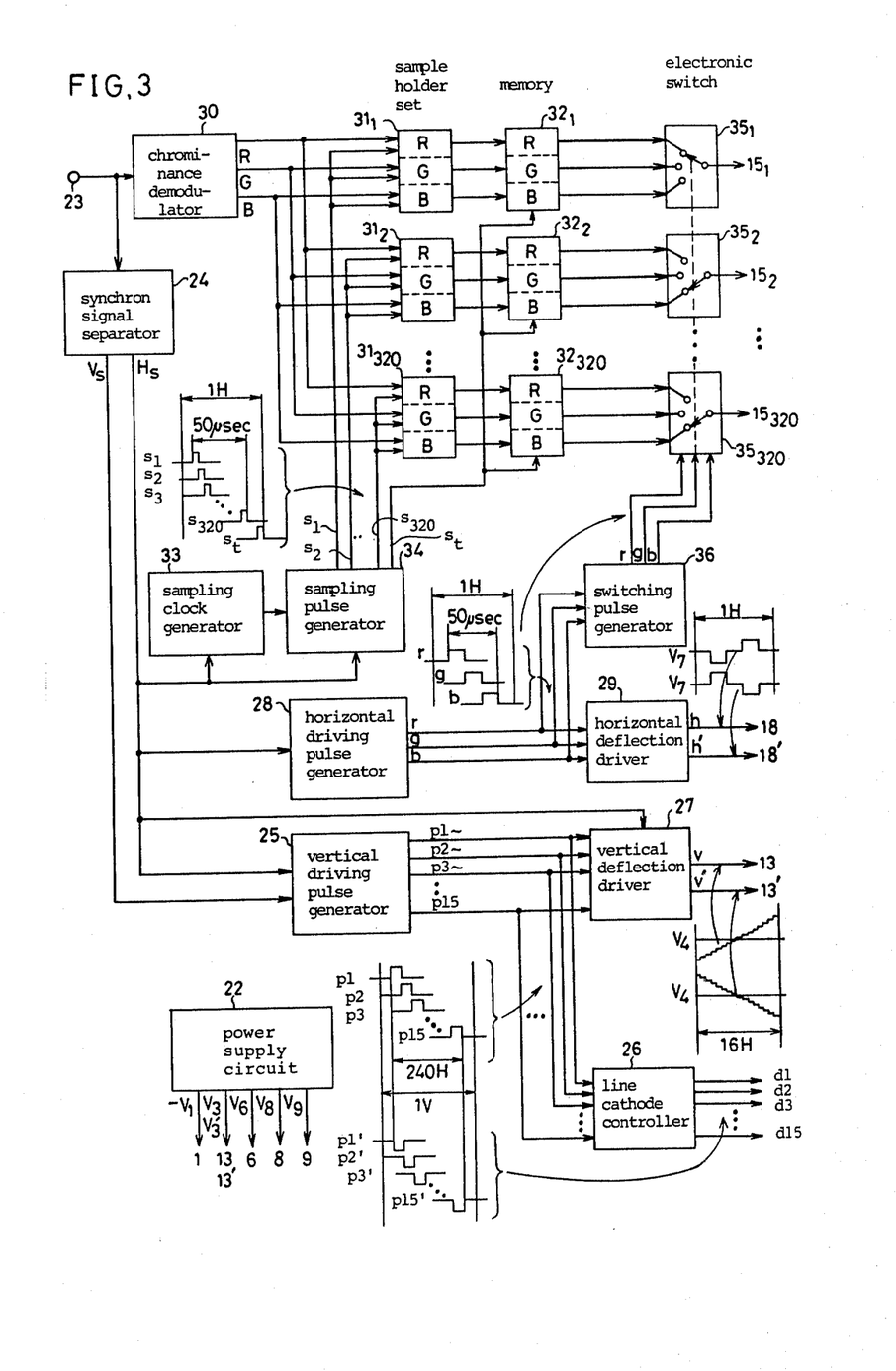
FIG. 3 is a circuit block diagram showing a fundamental electric construction which is for operating the apparatus of FIG. 1 and is, a not yet disclosed preceding stage to reach the present invention.

FIG. 3 shows a circuit block diagram of a fundamental electric construction of the apparatus of FIG. 1. The explanation starts from the part to drive the cathode ray tube to form a raster on its phosphor screen.

A power supply 22 is for impressing necessary voltages on various electrodes of the flat cathode ray tube of FIG. 1. The following DC voltages are supplied to the electrodes:

| | |
|---|---|
| $-V_1$ | to back electrode 1, |
| $V_3$ | to vertical beam-focussing electrode 3., |
| $V_3'$ | to vertical beam focussing electrode 3', |
| $V_6$ | to horizontal beam-focussing electrode 6, |
| $V_8$ | to acceleration electrode 8, |
| $V_9$ | to phosphor screen 9. |

An input terminal 23 receives an ordinary composite video signal and gives it to a synchronizing signal separator 24 and to a chrominance demodulator 30. The synchronizing signal separator 24 separates and issues vertical synchronizing signal $V_s$ and horizontal synchronizing signal $H_s$. A vertical driving pulse generator 25 comprises a counter which counts the horizontal synchronizing signal $H_s$ and is reset by the vertical synchronizing signal $V_s$, and issues 15 driving pulses p1, p2, p3 . . . p15, each having a duty time of 16H (1H is the time period for one horizontal scanning). The fifteen pulses p1 to p15 are issued during an effective vertical sweep period, which is the time length of one vertical sweep period exclusive of vertical fly-back time and is of 240H time length). The driving pulses are then given to the line cathode controller 26, where they are inversed of polarity to produce pulses p1', p2', p3' . . . p15' falling down to 0 V at respective inversed peak period (of 16H length) and retaining 20 V for other period, and is fed to respective line cathodes 201, 202, 203 . . . 215. The line cathodes are always heated by a small voltage DC current so as to be able to emit electrons at any time, and the electrons are taken out, when the pulse of a selected line cathode is at its peak (0 V), by means of a positive electric field towards the vertical beam-focussing electrode 3 and subsequent other electrodes.

For a period other than the peak (0 V) of the pulses impressed on a line cathode, because of negative electric field formed by impression of +20 V thereon, the line cathodes do not emit electron beam. That is, one of the 15 line cathodes in turn emits electron beams. Therefore, the line cathodes are activated in turn from the top one 201 to the bottom one 215 each for 16H time period. The emitted electrons are driven forward to the vertical beam-focussing electrodes 3, 3' and focussed to form a horizontal sheet-shaped electron beam.

A vertical deflection driver 27 comprises a counter for counting horizontal synchronizing signal $H_s$ and is reset by the output pulses p1, p2 . . . p15 of the vertical driving pulse generator 25 and an A/D converter for A/D converting the count output. And the vertical deflection driver 27 issues a pair of vertical deflection signals v, v', which are 16-step rising sawtooth wave and 16-step falling sawtooth wave, respectively, both having center voltage of $V_4$. These vertical deflection signals v and v' are impressed on the upper vertical deflection electrodes 13 and the lower vertical deflection electrodes, respectively. Accordingly, the sheet shaped electron beams are vertically stepwisely deflected in 16 steps and repeat the same. And therefore, a horizontal line displayed on the phosphor screen stepwisely falls from top position to bottom position in 16 steps in one vertically divided segment 221, 222 . . . or 235 of FIG. 1.

Since the activation of the line cathodes is stepwisely shifted one by one downward every 16H time period, when the horizontal line on the phosphor screen comes down and arrives at the bottom of the first vertically divided segment 221, the next moving of the horizontal line on the phosphor screen starts from the top position of the second vertically divided segment 222, and the similar downward shifting of the horizontal line proceeds until the horizontal line arrives at the bottom of the 15th (lowest) vertically divided segment 235, and the horizontal line goes back to the top of the first segment 221. That is, the vertical deflection of the horizontal line continuously proceeds from the top (No. 1 horizontal line) to the bottom (No. 240, i.e., (15×16)th) of the phosphor screen 9, thereby forming a raster of 240 horizontal lines.

The sheet-shaped electron beam is then divided into 320 rod-shaped electron beams having substantially round sections when passing through the vertically oblong slits 14, 14 . . . of the beam-control electrode $15_1$, $15_2$ . . . and vertically oblong slits 16, 16 . . . of the horizontal beam-focussing electrode 6. The rod-shaped electron beams are controlled of their currents by means of voltage impressed on respective strip electrodes of the beam-control means 5, and further deflected by horizontal deflection means 7 so as to have one of three positions corresponding to R, G and B regions of the phosphor screen 9 by means of the horizontal deflection signals given by the horizontal deflection driver 29.

A horizontal driving pulse generator 28 comprises three stages of sequentially connected monostable multivibrators, the first stages of which is triggered by horizontal synchronizing signal $H_s$. And the horizontal driving pulse generator issues three pulses r, g and b of the same pulse widths. For one example, an effective horizontal scanning period of 50 μsec. is divided into 3 periods for the pulses r, g and b, accordingly, the pulses, r, g and b have 16.7 μsec. pulse width each. The horizontal driving pulses r, g and b are given to the horizontal deflection driver 29, which is switched by the horizontal driving pulses r, g and b and issues a pair of horizontal deflection signals h and h'. These horizontal deflection signals h and h' are three step rising signal and three step falling signal, respectively, and, both have the same center voltage $V_7$. These horizontal deflection signals h and h' are given to the horizontal deflection electrodes 18, 18, 18 . . . and 18', 18', 18' . . . disposed alternately in the horizontal deflection means 7. As a result, 320 rod-shaped electron beams are deflected at the same time to R, G or B regions on a same horizontal line of the phosphor screen.

It should be noted that in the construction shown in and elucidated referring to FIG. 1, the number of strip electrodes 18, 18' . . . of the horizontal electrodes are 320 for the 320 rod-shaped electron beams, and the strip electrodes 18, 18' . . . are alternately connected to the output terminals h and h' of the horizontal deflection driver. Accordingly, the electric fields of horizontal deflection gaps defined by neighboring two strip electrodes 18 and 18' are not of the same direction. Namely, the directions of electric field of the horizontal deflection gaps are alternatingly opposite each other for neighboring horizontal deflection gaps. The effect of this alternatingly opposite electric field is compensated as will be elucidated later.

Thus, the horizontal line on the phosphor screen at one time displays red image at the same time, at the next time green image at the same time and at the next time blue image at the same time, and at the next time the line proceeds to the next lower line whereon the same is repeated.

The beam intensity control is made as follows:

The input composite video signal received at the input terminal 23 is given to the chrominance demodulator 30 where color differential signals R-Y and B-Y are demodulated and G-Y is also produced by known matrix circuit therein, and by processing these color differential signals with a luminance signal Y, primary color signals R, G and B are produced. The primary color signals R, G and B are given to 320 sets of sample-hold means $31_1$, $31_2$ . . . $31_{320}$, each comprising three elementary samplehold circuits for R, G and B color signals. The output signals of the 960 elementary sample-hold circuits are given to 320 sets of memory means $32_1$, $32_2$ . . . $32_{320}$, each comprising three memories for R, G and B color signals.

On the other hand a sampling clock generator 33 comprises PLL (phase locked loop) circuit, and issues sampling clock pulses of 6.4 MHz, which is controlled to have a predetermined phase difference against the horizontal synchronizing signal H. The sampling clock pulses are given to the sampling pulse generator 34, wherein by means of, for example, a shift register of 320 stages, 320 sampling pulses $S_1$, $S_2$ . . . $S_{320}$, each having phase difference by 50 $\mu$sec/320 time inbetween, are produced and given to the sample hold circuits $31_1$, $31_2$ . . . $31_{320}$, respectively. After the last sampling pulse $S_{320}$, a transferring pulse $S_t$ is issued from the sampling pulse generator 34 to the memories $32_1$, $32_2$ . . . $32_{320}$. The sampling pulses $S_1$, $S_2$ . . . $S_{320}$ correspond to 320 picture elements in the horizontal direction on the phosphor screen 9, and their timings are controlled so as to have a constant relation with respect to the horizontal synchronizing signal $H_s$. By impressing the 320 sets of sampling pulses to respective 320 sets of sample-hold circuits, the sample-hold circuits $31_1$, $31_2$ . . . $31_{320}$ sample and hold R, G and B information of video signals therein. After finishing of the sample-hold for one horizontal line, upon receipt of the transfer signal $S_t$ by the memories, the sample-held informations are transferred at one time to the memories $32_1$, $32_2$ . . . $32_{320}$, and retained there for the next one horizontal scanning period (H=63.5 $\mu$sec).

The R, G and B information of the video signal for the one horizontal line stored in the memories $32_1$, $32_2$ . . . $32_{320}$ are led to 320 electronic switches $35_1$, $35_2$ . . . $35_{320}$, which are electronics switches comprising analog gate circuits for selectively leading the stored signals of a color R, G or B to the respective strip electrodes $15_1$, $15_2$ . . . $15_{320}$ of the beam control means 5. The switching circuits $35_1$, $35_2$ . . . $35_{320}$ are simultaneously switched, being controlled by switching pulses given from a switching pulse generator 36, which is controlled by the output pulses r, g and b of the horizontal driving pulse generator 28. The electronic switches $35_1$, $35_2$ . . . $35_{320}$ switch every 16.7 $\mu$sec (=50 $\mu$sec/3) for selectively leading the video signal information of R, G and B color in turn each for 16.7 $\mu$sec.

In the switching, the switching circuits of the odd number orders are switched in the order of R→G→B while the switching circuits of the even number orders are switched in the order of B→G→R, so that the effect of the alternatingly opposite directed electric fields produced by the horizontal deflection means 7 is compensated.

Hereupon it should be noted that timing (phases) of the switchings of the electronic switches $35_1$, $35_2$ . . . $35_{320}$ and the horizontal deflection driver 29 should be completely synchronized with each other, in order to avoide poor color impurity caused by undesirable mixing of a color signal with other color signals.

As a result of the operation as has been elucidated, the phosphor screen displays red color image of one horizontal line at one time, followed by green color image of the horizontal line at one time and further followed by blue color image of the horizontal line at one time, and then the same displaying is made proceeding to the next (lower) line, and thus displaying of one field having 240 horizontal lines is completed. And the displayings of the fields are repeated and television picture is obtainable on the phosphor screen 9.

In the case the number of picture elements on one horizontal line is selected twice or three times of the number of rod shape electron-beams each individually controlled by independent beam control electrodes $15_1$, $15_2$, . . . , the number of the above-mentioned sample-hold circuits must be increased twice or three times, to the number of the picture elements on the line, and relevantly, the number of the memories should also be increased to the same number. And each electronic switch should selectively connect the outputs of the increased number of memories time sharingly to the corresponding beamcontrol electrodes.

The primary colors of the phosphor regions are not necessarily limited to the combination of the R, G and B, but any other combination as the primary color of phosphors may be usable.

In the above-mentioned description, the words "horizontal" and "vertical" are used to imply that "horizontal" is the direction that the lines are displayed on the phosphor screen, and "vertical" is the direction that the displayed line is shifted to the next line to form a raster, and accordingly these words are not bound to the absolute spatial relation of the screen.

The above-mentioned apparatus can provide a color television apparatus of very flat and compact type, and a sufficiently bright and clean display image is ensured since known combination of the color phosphors and cathode ray beams is used.

Figure 4:
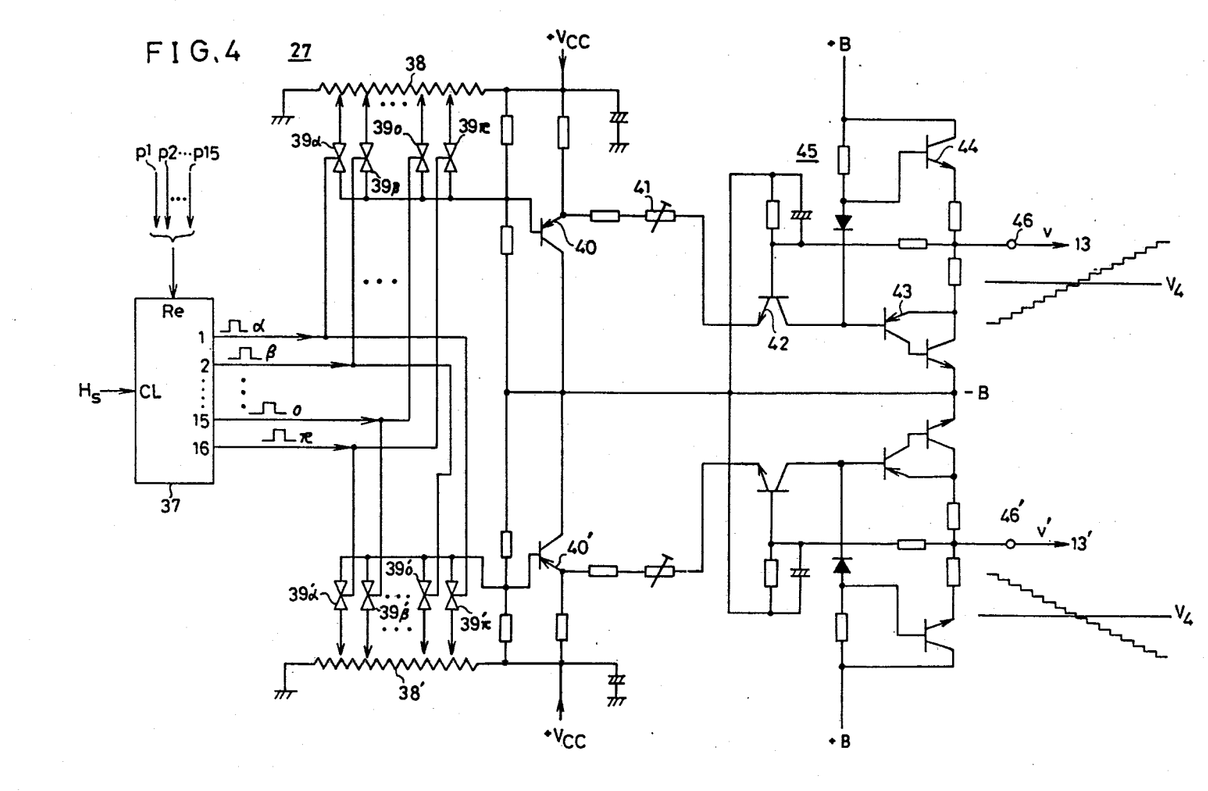
FIG. 4 is a circuit diagram showing an example of a vertical deflection driver 27.
Figure 5:
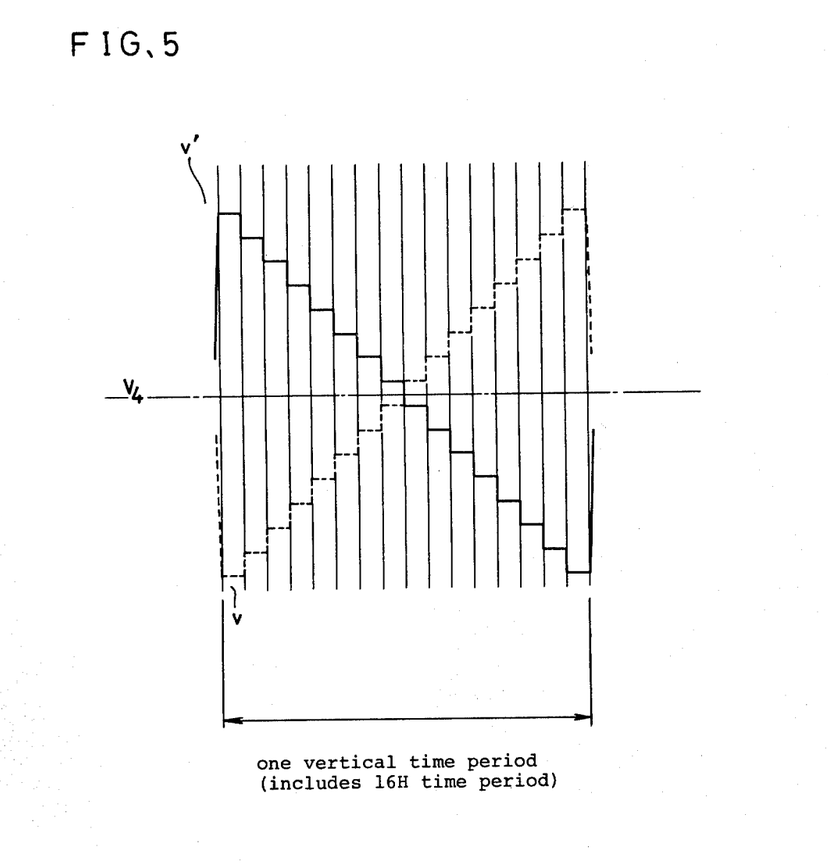
FIG. 5 is an enlarged waveform chart of a signal to be impressed on a vertical deflection means of the present invention.
Figure 6:
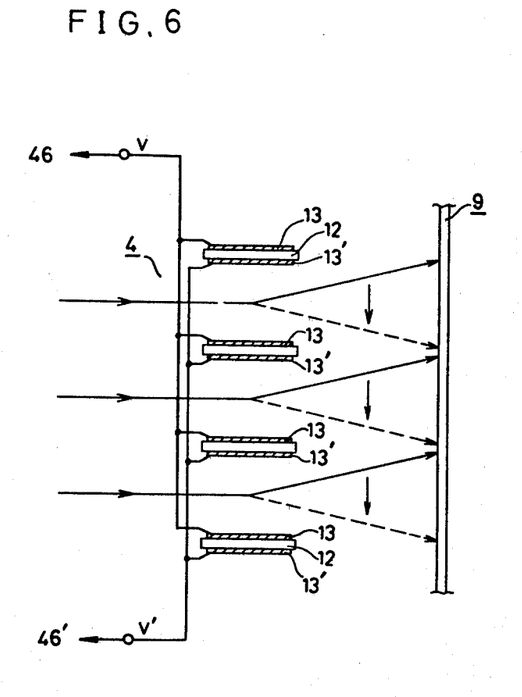
FIG. 6 is a schematic sectional side view showing a relation between vertical deflection electrodes and phosphor screen.

FIG. 4 shows a representative example of the vertical deflection driver 27. A ring-counter 37 is reset by rising edges of the vertical driving pulses p1, p2 ... p15 from the vertical driving pulse generator 25, counts the horizontal synchronizing signals H and issues output signals $\alpha, \beta, \gamma \ldots o$ and $\pi$ from its 16 output terminals. On the other hand, a potentiometer 38 has 16 intermediate output terminals, through which 16 output voltages of different levels are taken out and given to the analog switches $39_\alpha, 39_\beta \ldots 39_\pi$, respectively. These analog switches are controlled by the above-mentioned signals, ..., in a manner to be made conductive each for 1H time period in different timing sequence. Therefore, at the common connected output-terminal of the analog switches 39, 39 ... 39, a stepwise rising output having 16 step voltage levels is obtainable. The stepwise output is taken out through an emitter follower 40, adjusted of amplitude by the variable resistor 41, amplified by a B-class amplifier 45 constituted by transistors 42, 43 and 44, and issued as the vertical deflection signal v through an output terminal 46. On the other hand, the vertical deflection signal v' is issued through the output terminal 46' in the similar manner, by switching the voltages of the potentiometer 38' by the analog switches 39', 39' ... 39'. FIG. 5 shows waveforms of the vertical deflection signal v (by dotted line) and v' (by solid line), and FIG. 6 schematically shows the states of vertical deflection. As shown in FIG. 6, the vertical deflection signals v and v' are impressed to the upper vertical deflection electrodes 13', 13' ... and the lower vertical deflection electrodes 13, 13 ..., and thereby the electron beams from a line cathode are vertically deflected to have 16 vertical positions, thereby forming 16 horizontal lines on the phosphor screen 9.

According to the above-mentioned display apparatus, a color video display can be made. However, the apparatus has the problem that the horizontal lines on the phosphor screen are not necessarily uniform on all the portion of the screen, because of nonuniformity of vertical deflection caused by measuring error in the structure of vertical deflection electrodes and structural relations thereto, which results in producing vertical nonuniformities of brightness and measure of image and undesirable horizontal black bands and white bands at the boundaries of the vertically divided segments.

Figure 7:
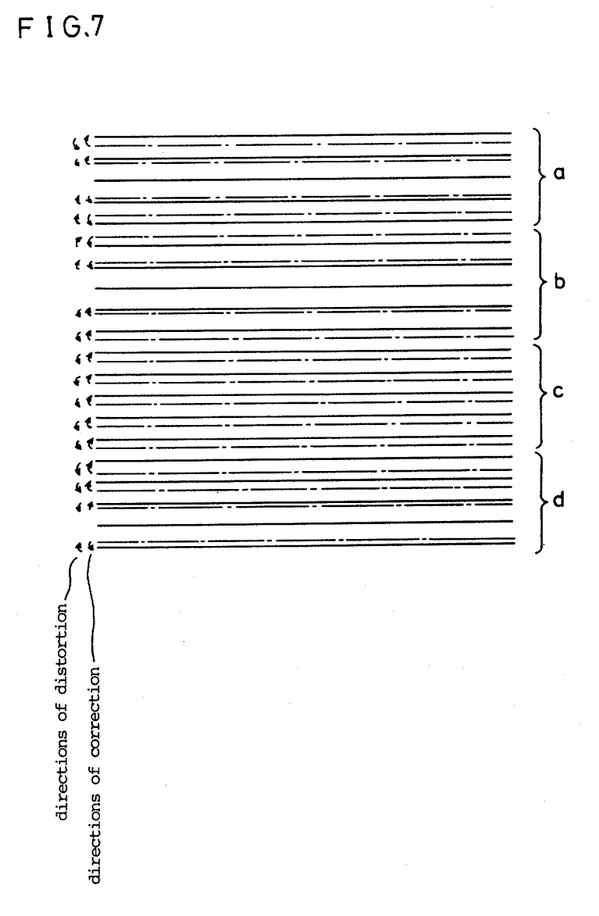
FIG. 7 is a schematic front view of a displayed raster on the phosphor screen for illustrating error and correction of the horizontal lines on the raster.

The apparatus in accordance with the present invention can display an image of a high quality without the undesirable vertical nonuniformities of brightness and nonuniform vertical partial expansions or contractions of image and undesirable horizontal black lines and white bands. FIG. 7 schematically shows such states of the raster, wherein solid lines show ideal positions of the horizontal lines and chain lines show states of slipping of the horizontal lines. That is, in the vertically divided segment "a", the lines have slipped to the center of the part, in the vertically divided segment "b" the lines have slipped to the upper and lower parts of the segment, in the vertically divided segment "c" the lines have slipped downwards and in the vertically divided segment "d" the lines have slipped to the near bottom part at one fifth from the bottom of the segment. Though only five lines are shown in the vertically divided segments in FIG. 7 for the simplicity of the drawing, it should be noted that the actual vertically divided segments shown and described in the foregoing figures and descriptions have 16 lines.

In the apparatus in accordance with the present invention, the above-mentioned slippings of the lines can be corrected or adjusted by means of electric means.

Figure 8:
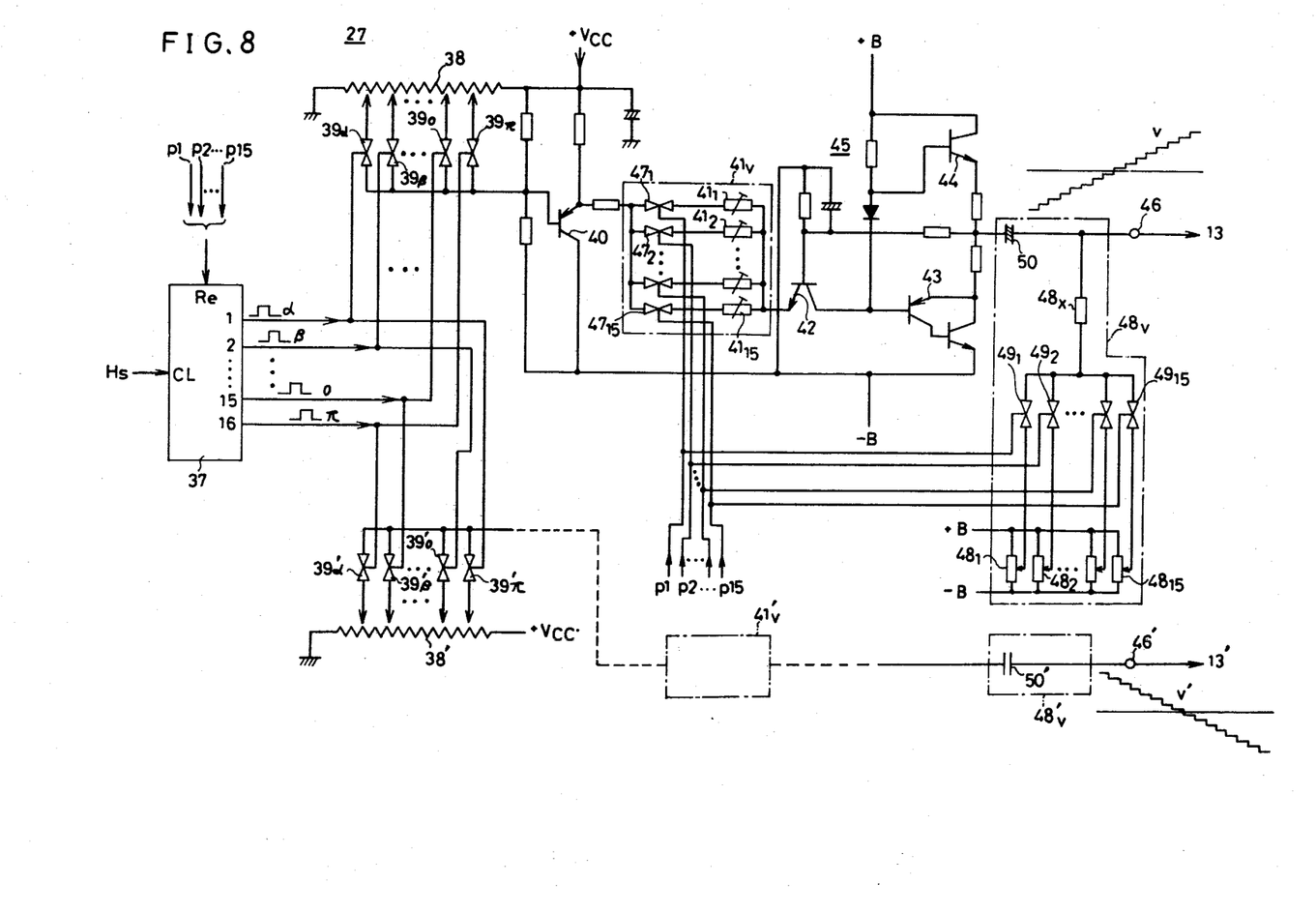
FIG. 8 is a circuit diagram showing an example of a circuit for generating vertical deflection signal.

FIG. 8 shows one example of a vertical deflection circuit for realizing such electrical adjusting. The circuit is similar as FIG. 4, but an amplitude adjusting circuit $41_v$ is connected in place of the variable resistor 41 of the circuit of FIG. 4. The variable resistor circuit $41_v$ comprises 15 variable resistors $41_1, 41_2 \ldots 41_{15}$ connected in series to analog switches $47_1, 47_2 \ldots 47_{15}$, which are receiving signals p1, p2 ... p15, respectively from the vertical driving pulse generator 25. Therefore, by adjusting the variable resistors $41_1, 41_2 \ldots$ adjustments of the amplitudes of the vertical deflection signal v for the 15 vertically divided segments $22_1, 22_2 \ldots$ respectively can be made. Furthermore, the circuit of FIG. 8 comprises a center level adjusting circuit $48_v$, which comprises variable resistors $48_1, 48_2 \ldots 48_{15}$ and analog switches $49_1, 49_2 \ldots 49_{15}$ connected in series to the formers, and receiving control signals p1, p2 ... p15, respectively. The output of the center level adjusting circuit $48_v$ is combined with the output of the output circuit 44+43 through a coupling impedance $48_x$ to the output terminal 46, to which the output of the output circuit 44+43 is given through a DC stop capacitor 50. Therefore, by adjustments of the variable resistor $48_1$, $48_2$ ..., the center levels of the vertical deflection signals v, v' for the vertically divided segments $22_1, 22_2$ ..., respectively, can be adjusted. Therefore, by combinations of the adjustments by means of the amplitude adjusting circuit $41_v$ and the center level adjusting circuit $48_v$, all kinds of the above-mentioned displacements shown in FIG. 7 of the lines from the designed positions can be adjusted to the right positions.

For example, in the schematic example of FIG. 7, firstly for the vertically divided segment "a" the adjustment is carried out by controlling the variable resistor $41_1$ so as to increase amplitude of the vertical deflection signal v for the segment thereby to expand the vertical deflection width, secondly for the vertically divided segment "b" the adjustment is carried out by controlling the variable resistor $41_2$ so as to decrease amplitude of the vertical deflection signal v for the segment thereby to contract the vertical deflection width, thirdly for the vertically divided segment "c" the adjustment is carried out by controlling the variable resistor $48_3$ so as to raise the DC voltage to be given through the impedance $48_x$ thereby to raise the center level of the deflection signal v at the output terminal 46, and fourthly for the vertically divided segment "d" the adjustment is carried out by controlling the variable resistor $41_4$ so as to increase amplitude of the vertical deflection signal v and also controlling the variable resistor $48_4$ so as to raise the DC voltage to be given through the impedance $48_x$ thereby attaining raising of the center level of the output signal v at the output terminal 46 and also expansion of the deflection width.

In the above-mentioned elucidation, for the simplicity, the construction and adjustment operation of the other signal v' given at the output terminal 46' are omitted, but the construction of the circuits leading to the output terminal 46' including an amplitude adjusting circuit $41_v'$ and a center level adjusting circuit $48_v'$ for producing the output signal v' is quite similar to those of the former terminal 46 for the former output signal v, and the adjusting operation is also similar.

By means of the aforementioned construction and operation, the apparatus in accordance with the present invention is capable of electrically amending the slipping of the horizontal lines of the raster due to nonuniformity of the electrode construction, its measure of such mechanical reason, thereby enabling electrical adjusting of the raster so as to eliminate undesirable black or white lines and partial nonuniformity of the line pitches, and achieving good quality video image. The circuit for the segment by segment adjustments is not necessarily limited to the example of FIG. 8, but any circuit having the similar function is usable, and also, the means to combine the two kinds of adjustments, the amplitude adjustment and the center level adjustment, needs not be limited to the stage of the output terminal 46, but may be provided at other stages, for example, at the stage before the input side to the output amplifier stage 42+43+44.

Figure 9:
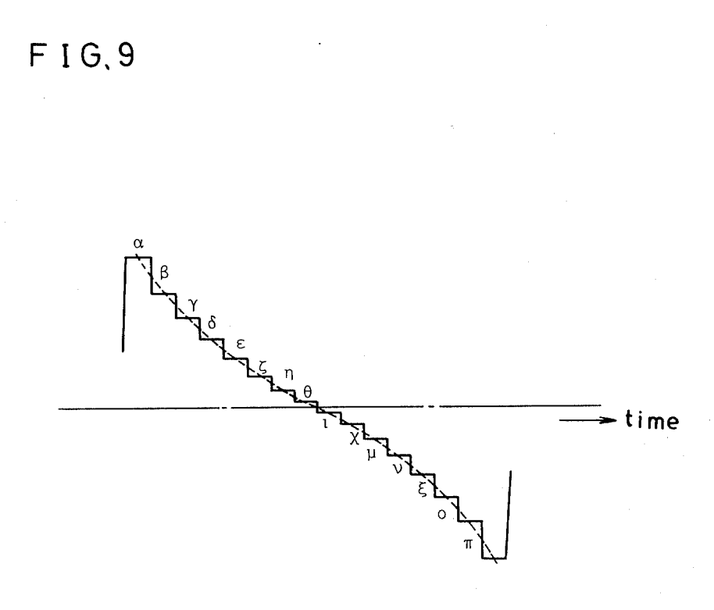
FIG. 9 is an enlarged waveform chart showing an example of vertical deflection signal produced by the circuit of FIG. 8.

In the above-mentioned apparatus, the distance from the center of deflection of the electron beam to the phosphor screen is shorter for the beam to impinge the center part of each vertically divided segment than the beam to impinge the upper and lower parts of the segment. Therefore when an ideal step wave signal having a straight or linear envelope curve is used as vertical deflection signal, the line gaps become wider at the upper and lower part of each segment than the center part thereof. On the other hand, depending on the electrode construction and voltages relation thereof, the upper part and the lower part may have smaller line pitches than the central part because of the effects of the high tension voltage impressed on the screen face. In order to compensate such nonuniformity of line pitches, the vertical deflection wave should be modified as to have an $\int$-curved envelope, for example, as shown by FIG. 9. Such modified envelope curve may be obtainable by adjustments of respective sliders of the variable resistors 38 and 38' one by one, but such individual adjustments of the sliders of the variable resistors 38 and 38' are very troublesome and time-consuming. The circuit of FIG. 10 is arranged in order to overcome such problem by enabing easy changing of nature of $\int$ -curve envelope of the step wave of the vertical deflection signal v.

Figure 10:
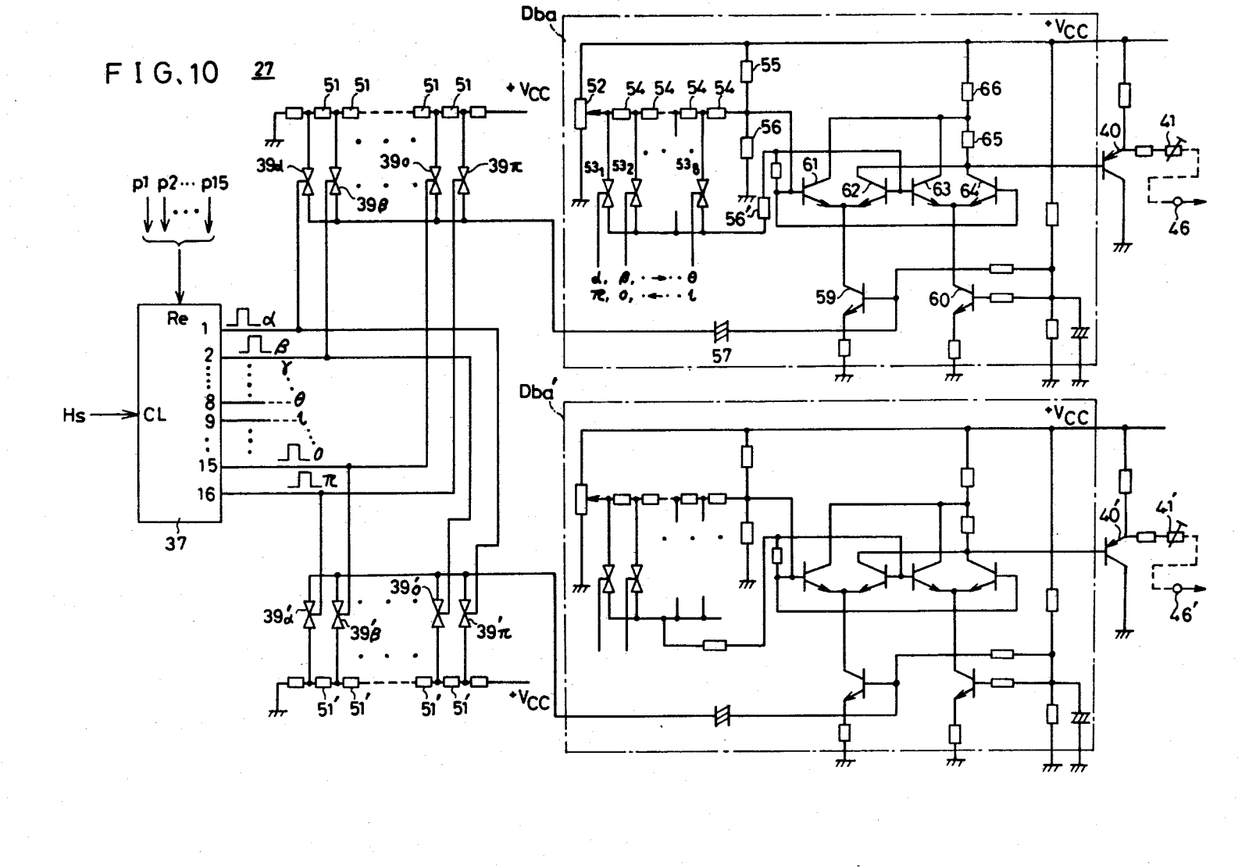
FIG. 10 is a circuit diagram showing another example of a circuit for generating vertical deflection signal, FIG. 11($a$) is an enlarged waveform chart showing an example of vertical deflection signal produced by the circuit of FIG. 10, FIG. 11($b$) is an enlarged waveform chart of a control signal for use in the circuit of FIG. 10.
Figure 11A:
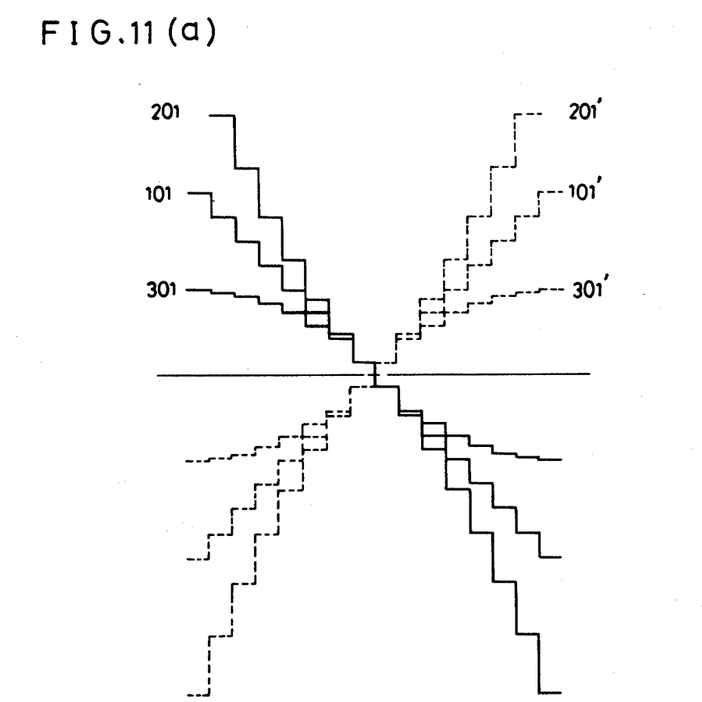
Figure 11B:
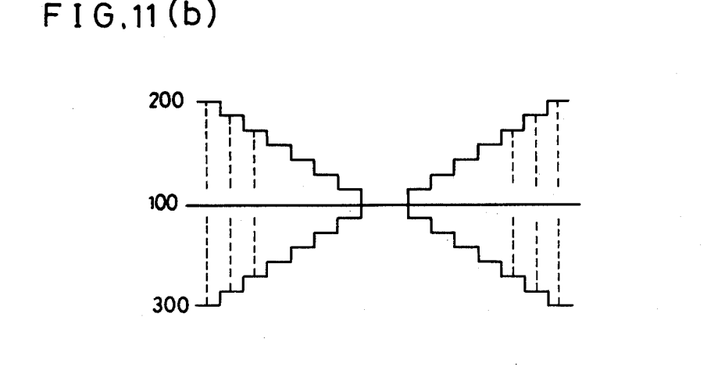

In the circuit of FIG. 10, which is an improved vertical deflection driver 27 shown in FIG. 3, a pair of double balance amplifier Dba and Dba' are provided in place of the output circuit 42+43+44 of FIG. 4, and the variable resistors 38 and 38' are replaced by a fixed voltage divider circuit comprising fixed resistors 51, 51 ... and 51', 51' .... Therefore, the output step wave signals obtained at the input terminal of equally constructed double balanced amplifiers Dba and Dba' have linear envelopes. The waves, then are subject to expansion or compression by means of the double balanced amplifier, which is a variable gain amplifier comprising differential amplifiers 61+62 and 63+64 connected by their input terminals (the bases of the transistors 61 & 62 and 63 & 64) to the collectors of the transistors 59 and 60, respectively, and voltage-adjustable voltage divider network 52+54+54 .... When the common base voltage of the transistors 62 and 63 is higher than those of the transistors 61 and 64, the input step wave signal through a capacitor 57 to the base of the transistor 59 is subject to expansion; and on the contrary, when the common base voltage of the transistors 62 and 63 is lower than those of the transistors 61 and 64, the input signal is subject to compression. The base voltages of the transistor 61 and 64 are fixed to a predetermined voltage (such as $\frac{1}{2} \times V_{cc}$) by a dividing network 55+56. The output terminals of the voltage divider 52+54 ... are connected through analog switches $53_1$, $53_2$ ... $53_8$ to the bases of the transistors 62 and 63, and the analog switches $53_1$, $53_2$ ... $53_8$ are controlled by the switching pulses $\alpha, \beta, \gamma ... o, \pi$ of 1H pitch from the ring counter 37 in a manner that $53_1$ is by the pulses $\alpha$ and $\pi$, $53_2$ is by $\beta$ and $\lambda$, ... and $53_8$ is by pulses $\theta$ and $\iota$, respectively received, for example, through OR circuits, and thereby the bases of the transistors 62 and 63 receive a step wave of a uniform step height. FIG. 11(b) shows examples of curves of such step wave, wherein curve 100 shows a state where the slider terminal of the variable resistor 52 is at the point of the same voltage as the divided voltage of the divider 55+56. In this state, the input signal to the bases of the transistor 62 and 63 is a flat one or constant voltage, and therefore the gains of the differential amplifiers are constant, and accordingly the output signals to be given to the subsequent stage transistors 40 and 40' become step waves 101 and 101' of linear envelopes as shown in FIG. 11(a). When the slider of the variable resistor 52 is slid upwards, the input signal to the bases of the transistors 62 and 63 becomes to the curve 200 of FIG. 11(b). In this state the gains of the differential amplifiers are controlled to increase as the vertical deflection angles become larger, and therefore the signals to be given to the subsequent stage transistors 40 and 40" become expanded step waves of curves 201 and 201' of FIG. 11(a). When the slider of the variable resistor 52 is slid downwards, the input signal to the bases of the transistors 62 and 63 becomes to the curve 300 to FIG. 11(b), and in this state, the gains of the differential amplifiers are controlled to decrease as the vertical deflection angles become larger, thereby making the signals to be given to the subsequent stage transistors 40 and 40' become compressed step waves of curves 301 and 301' of FIG. 11(a).

As a result, the circuit of FIG. 10 enables adjustment of the envelope curve of the step wave of the vertical deflection wave and thereby can freely change the deflection signal to any degree between the expanded step wave 201, 201' and the compressed step wave 301, 301' only by adjusting of the variable resistor 52. The expansion or compression treated signals are then amplitude-controlled by the variable resistors 41, 41' and amplified by suitable output circuits such as shown in FIG. 4 and are lead to the output terminals 46 and 46', and fed across the vertical deflection electrodes 13 and 13'.

The way of adjustment is that, when the pitches of the horizontal lines are narrower at upper and lower part of a vertical segment than its center part, the slider of the variable resistor 52 should be slid upwards to the $V_{cc}$ source side, and when the pitches of the horizontal lines are larger at upper and lower parts of a vertical segment than its center part, the slider of the variable resistor 52 should be slid down to the $-V_{cc}$ or ground voltage side.

What is claimed is:

1. An image display apparatus comprising:
   a phosphor screen having a phosphor layer for emitting light at impingement by an electron beam,
   an electron beam source for in-turn emitting a predetermined number of horizontal rows of electron beams, for producing horizontal lines of image on said phosphor screen, a vertical deflection means for vertical deflections of said electron beams of said horizontal rows in a manner that electron beams of a horizontal row impinging said phosphor screen at one vertically divided segment of said phosphor screen corresponding to one of said horizontal rows are simultaneously driven vertically, thereby vertically moving one of said horizontal lines in said vertically divided segment, a flat shaped vacuum enclosure containing the above-mentioned components therein, one end face thereof forming a screen face in which the phosphor screen is provided, and an adjusting means for adjusting pitches of horizontal lines produced in said vertically divided segment by adjusting a vertical deflection signal which is impressed on said vertical deflection means for deflecting said electron beams vertically, for respective vertically divided segments.

2. An image display apparatus in accordance with claim 1, wherein
said adjusting means comprises means for adjusting either one of waveform, amplitude or DC levels of said signal.

3. An image display apparatus in accordance with claim 1, wherein
said signal is a step wave signal, and
said adjusting means is for adjusting waveform of said step wave signal between an expanded shape and a compressed shape by controlling the envelope of said step wave signal to vary from $\int$-curved envelope to $\int$-curved envelope for one vertically divided segments.

4. An image display apparatus in accordance with claim 1, wherein
said adjusting means is for adjusting said pitches of said horizontal lines respectively for said vertically divided segments.

5. An image display apparatus in accordance with claim 1, wherein
said signal is a step wave signal having an oblique envelope.

6. An image display apparatus in accordance with claim 5, which comprises
a voltage source means for feeding a predetermined number of voltages to define respective steps of said step wave,
a predetermined number of switch means for in turn feeding said voltages to an output circuit, and
a vertical driving pulse generator means for producing driving pulses for driving said switch means in turn thereby to display said horizontal lines in sequence during each time period for displaying in one vertically divided segment.

7. An image display apparatus in accordance with claim 6, wherein
said voltage sources are voltage divider network comprising a predetermined number of resistors for defining said respective steps of said step wave.

8. An image display apparatus in accordance with claim 6 or 7, which further comprises
a means for adjusting the value of said steps, amplitudes of said signal and/or DC level of said signal.

9. An image display apparatus in accordance with claim 6, which further comprises
a means for adjusting either one of envelope wave form, amplitude or DC level of said step wave signal.

10. An image display apparatus in accordance with claim 2, wherein
said adjusting means is for adjusting said horizontal lines, in turn respectively for said vertically divided segments.

11. An image display apparatus in accordance with claim 3, wherein
said adjusting means is for adjusting said pitches of said horizontal lines, in turn respectively for said vertically divided segments.

* * * * *